US009262465B1

(12) United States Patent
Chen et al.

(10) Patent No.: US 9,262,465 B1
(45) Date of Patent: Feb. 16, 2016

(54) DETECTION OF MISMATCH BETWEEN BOOK CONTENT AND DESCRIPTION (71) Applicant: Amazon Technologies, Inc., Reno, NV (US)

(72) Inventors: Hong Chen, Bellevue, WA (US); Rudy Darmawan, Kenmore, WA (US)

(73) Assignee: Amazon Technologies, Inc., Reno, NV (US)

( * ) Notice: Subject to any disclaimer, the term of this patent is extended or adjusted under 35 U.S.C. 154(b) by 232 days.

(21) Appl. No.: 14/133,474

(22) Filed: Dec. 18, 2013

(51) Int. Cl.
*G06F 7/00* (2006.01)
*G06F 17/00* (2006.01)
*G06F 17/30* (2006.01)

(52) U.S. Cl.
CPC .................. *G06F 17/30371* (2013.01)

(58) Field of Classification Search
CPC ............ G06F 17/2785; G06F 17/2211
USPC ........................................... 707/690
See application file for complete search history.

(56) References Cited

U.S. PATENT DOCUMENTS

| | | | | |
|---|---|---|---|---|
| 5,528,516 | A * | 6/1996 | Yemini | G06F 11/2257 702/119 |
| 6,205,261 | B1 * | 3/2001 | Goldberg | G06K 9/03 382/187 |
| 6,757,071 | B1 * | 6/2004 | Goodman | H04L 29/06 358/1.13 |
| 8,229,934 | B2 * | 7/2012 | Furusawa | G06F 17/30864 707/741 |
| 9,015,161 | B2 * | 4/2015 | Kuroiwa | G06K 9/00442 707/737 |
| 2004/0049498 | A1 * | 3/2004 | Dehlinger | G06F 17/2785 |
| 2006/0294453 | A1 * | 12/2006 | Hirata | G10L 15/26 715/203 |
| 2011/0144978 | A1 * | 6/2011 | Tinkler | G06F 17/2715 704/10 |
| 2014/0058910 | A1 * | 2/2014 | Abeles | G06Q 50/265 705/31 |
| 2015/0007137 | A1 * | 1/2015 | Phelan | G06F 8/73 717/123 |

* cited by examiner

*Primary Examiner* — Binh V Ho
(74) *Attorney, Agent, or Firm* — Schwabe Williamson & Wyatt PC (57) ABSTRACT Techniques described herein provide for a method, system, and apparatus for determining whether a mismatch is present between content and a description associated with a literary work. In various embodiments, a matching score may be calculated based on a number of stems identified from the description that match stems identified from the content. The matching score may be adjusted based on a number of name entities identified from the description that match one or more words in the content. The computed matching score may then indicate whether the description and the content correspond to a same literary work. According to one embodiment, the description and the content correspond to the same literary work even where the computed matching score indicates a mismatch if a title is determined to match in the content. Other embodiments may be described and claimed.

20 Claims, 8 Drawing Sheets

DETECTION OF MISMATCH BETWEEN BOOK CONTENT AND DESCRIPTION

BACKGROUND

Generally, computing systems feature persistent storage, the capacities of which may vary by orders of magnitude but are often on the scale of billions of bytes—i.e., gigabytes (GB). Persistent storage of such an appreciable capacity offers myriad benefits for storing information, such as spatial and distributive characteristics that are absent from tangible manifestations of information. Voluminous textual information that might otherwise occupy significant space may be digitally stored in an area that is infinitesimally fractional compared to printed media. For example, the dimensions of electronic book may be comparable to that of an average printed paperback book, but the electronic book may feature persistent storage capable of storing therein thousands of books whereas a printed book inherently includes text for only that book. Additionally, the distribution of digital information may be enormously faster, more efficient, and broader than tangible distribution of the same. An author may transmit his or her work as signals over a network, and in so doing more quickly disseminate that work to a larger audience than a single printed copy of that same work.

Though convenient, the digital dissemination of information may still require a user to review that digital information to discern portions that are of interest to that user. For example, a user may examine text from a plurality of different digital files that each features a respective literary work so that the user may determine one or more literary works that are of interest to the user. To facilitate the review process for a user, a digital textual description (e.g., a synopsis or abstract) may be provided to the user so that the user may identify the content of the literary work. Moreover, the description may decrease resource consumption of one or more computing systems, such as where the user the attempts to access a literary work over a network. In such instances, a description corresponding to a literary work may be transmitted to the user instead of the content corresponding to that literary work, because the description will typically require a smaller amount of data storage and communication than the content itself.

A description and content intended to correspond to a single literary work may be separately submitted for digital dissemination. The separate submission of the content from the description may lead to some errors—e.g., an author may mistakenly publish a description that does not match the content of the corresponding literary work. Errors due to incongruous descriptions and contents may not be discovered until a user accesses (e.g., downloads) content corresponding to one literary work based on a mismatched description (e.g., a description corresponding to a different literary work). In practice, mismatched descriptions and contents may negatively impact users' experiences with and perceptions of digital information, as well as increase costs, overhead, and the like that are commensurate with rectifying those mismatched descriptions and contents.

BRIEF DESCRIPTION OF THE DRAWINGS

The embodiments described herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

According to various embodiments, a server system may provide an interface over a network to a client system. The provided interface may allow a user (e.g., an author or publisher) to input a title, a description, and a content associated with a literary work. The interface may present fields to the user at the client system so that the user may separately input the title, description, and content associated with the literary work. For example, the interface may include textual input fields for the title and the description, whereas the field to receive the content may be adapted to receive a file (e.g., a text file or a binary file). Using the interface, the user may type the title and description into the appropriate fields and select a file in which the content is stored. The user may then submit these inputs from the client system to the server system. In response, the server system may perform operations to determine whether a mismatch is present between a description and a content associated with a literary work. The server system may determine a matching score based on whether a sufficient number of words that appear in the submitted description also appear in the submitted content. If the server system determines that the matching score indicates a mismatch is present between the submitted description and the submitted content associated with the literary work, the server system may provide a notification to the client system indicating that the description does not match the content.

In various embodiments, the server system may decline to provide a mismatch notification to the client system where the submitted title appears verbatim in the submitted content, even where the server system determines that matching score indicates that the description does not match the content. This course of action may be desirable where, for example, the user intentionally submits a description that does not summarize or abstract the content associated with the literary work, such as where the user desires to include a biography of the author in the description.

Figure 1:
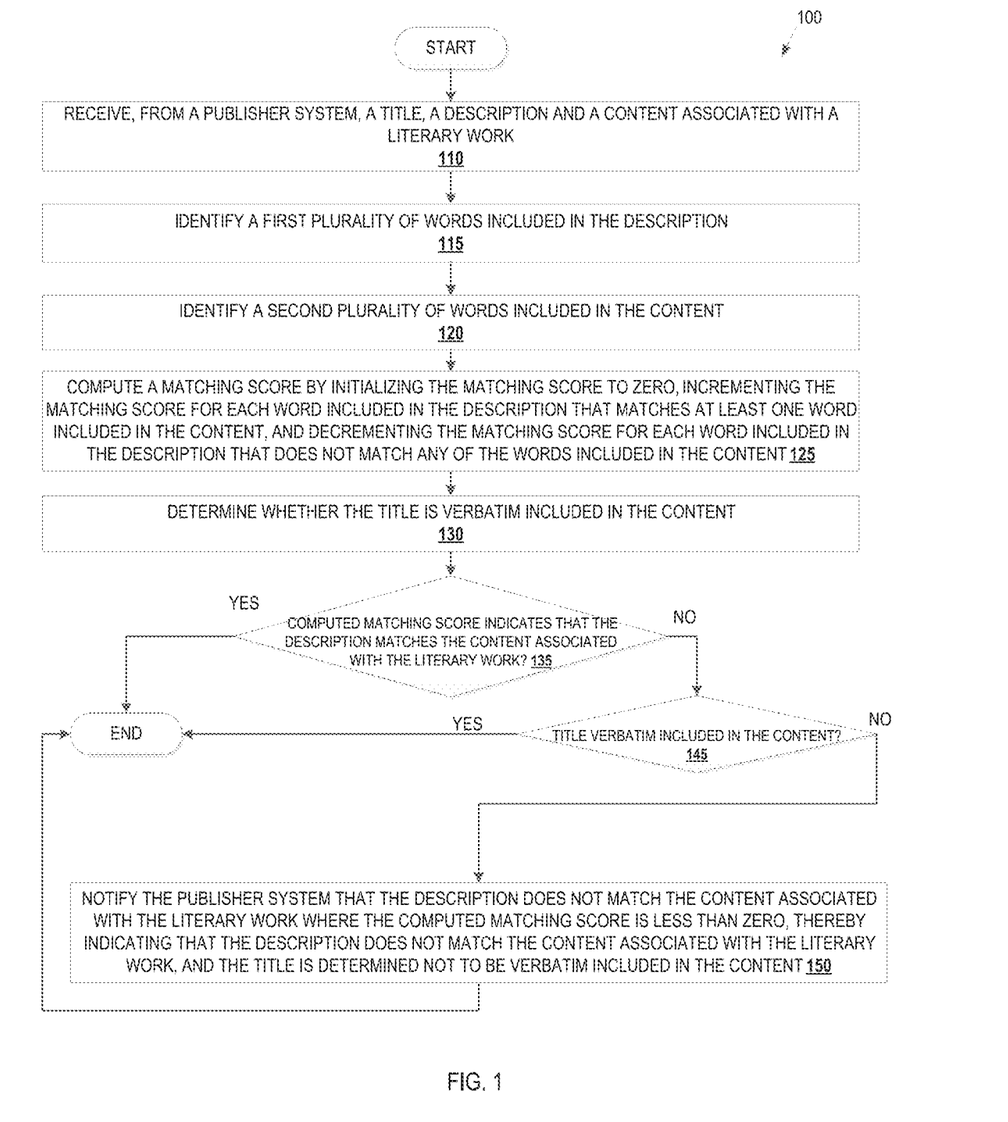
FIG. 1 is a flow diagram depicting a method for determining whether a mismatch is present between a description and a content associated with a literary work, according to various embodiments.

FIG. 1 illustrates a method 100 for determining whether a mismatch is present between a description and a content associated with a literary work, according to various embodiments. While FIG. 1 illustrates a plurality of sequential operations, one of ordinary skill would understand that one or more operations of the method 100 may be transposed and/or performed contemporaneously.

To begin, the method 100 may include an operation 110 for receiving a title, a description, and a content associated with a literary work from a publisher system. This information may be received as three separate fields: a first field adapted for receiving the title of the literary work, a second field adapted for receiving a description of the literary work, and a third field adapted for receiving the content that comprises the literary work. In various embodiments, these three fields may be of different input types—e.g., the first and second fields for title and description, respectively, may be adapted to receive textual input, whereas the first field for the content may be adapted to receive a file, such as a text file or a binary file. According to one embodiment, an interface is provided to the publisher system over a network, such as a website, web-based application, or the like adapted to be provided over the Internet.

Based on the received description, the method 100 may include an operation 115 for identifying a first plurality of words included in the description. In various embodiments, a word from the received description may be identified according to its stem. Similar to operation 115, operation 120 may include identifying a second plurality of words included in the received content. In various embodiments, a word from the received content may be identified according to its stem. A stem corresponding to a word included in the received content may be identified in a variety of ways, according to the embodiment. In various embodiments, the content words may be identified in a manner analogous to or consistent with the approach used to identify words included in the description.

From the identified description and content words, operation 125 may include computing a matching score based on a number of words included in the description that match words included in the content. According to one embodiment, the matching score may be initialized to a default value (e.g., zero) and incremented or decremented for each description word based on whether that description word appears in the plurality of content words. Because some words will appear more frequently across a plurality of literary works, each description word may have associated therewith a significance value; a significance value may be computed for each description word in connection with operation 125 based on, for example, how common the word is in a corpus. The matching score may be incremented or decremented by the significance value for each description word so that words are weighted in the computing of the matching score. For example, a respective significance value associated with a respective description word may be added to the matching score where the respective description word matches at least one word of the content words. Correspondingly, a respective significance value associated with a respective description word may be subtracted from the matching score where the respective description word matches does not match any of the content words.

Separately from operations 115-125 associated with computing the matching score, the method 100 may include an operation 130 for determining whether the received title is verbatim included in the received content. Well-known procedures may be utilized in determining whether the title is verbatim included in the content, such as adapting the content and the title to a consistent case, removing preceding and/or trailing spaces, and other practices that are suitable for comparing two strings of text. In various embodiments, this operation 130 may comprise parsing the title into one or more strings (e.g., a first string corresponding to a title and a second string corresponding to a subtitle) and verifying that the one or more strings match one or more string in the received content. In some embodiments, the method 100 may advance from operation 125 to decision block 135 so that this operation 130 may not occur—that is, where the computed matching score indicates that the description matches the content associated with the literary work, the method 100 may end instead of performing operation 130 for determining whether the title is verbatim included in the content.

According to decision block 135, the method 100 may proceed to operation end if the computed matching score indicates that the description matches the content of the associated literary work. In one embodiment, the matching score indicates that the description matches the content of the associated literary work where the matching score is a positive number. Conversely, the method 100 may proceed to decision block 145 if the computed matching score indicates that the description does not match the content of the associated literary work according to decision block 135. In one embodiment, the matching score indicates that the description does not match the content of the associated literary work where the matching score is a negative number. According to decision block 145, the method 100 includes determining if the title is verbatim included in the content. If the title is verbatim included in the content, then the method 100 may end.

However, the method 100 may advance to operation 150 if the title is not verbatim included in the content according to decision block 145. Operation 150 may comprise one or more operations for notifying the publisher that the description does not match the content for the associated literary work. In various embodiments, an electronic mail ("email") or other communication may be provided to the publisher to notify the publisher that a mismatch is determined to be present between the description and the content associated with a literary work and received from the publisher.

Figure 2A:
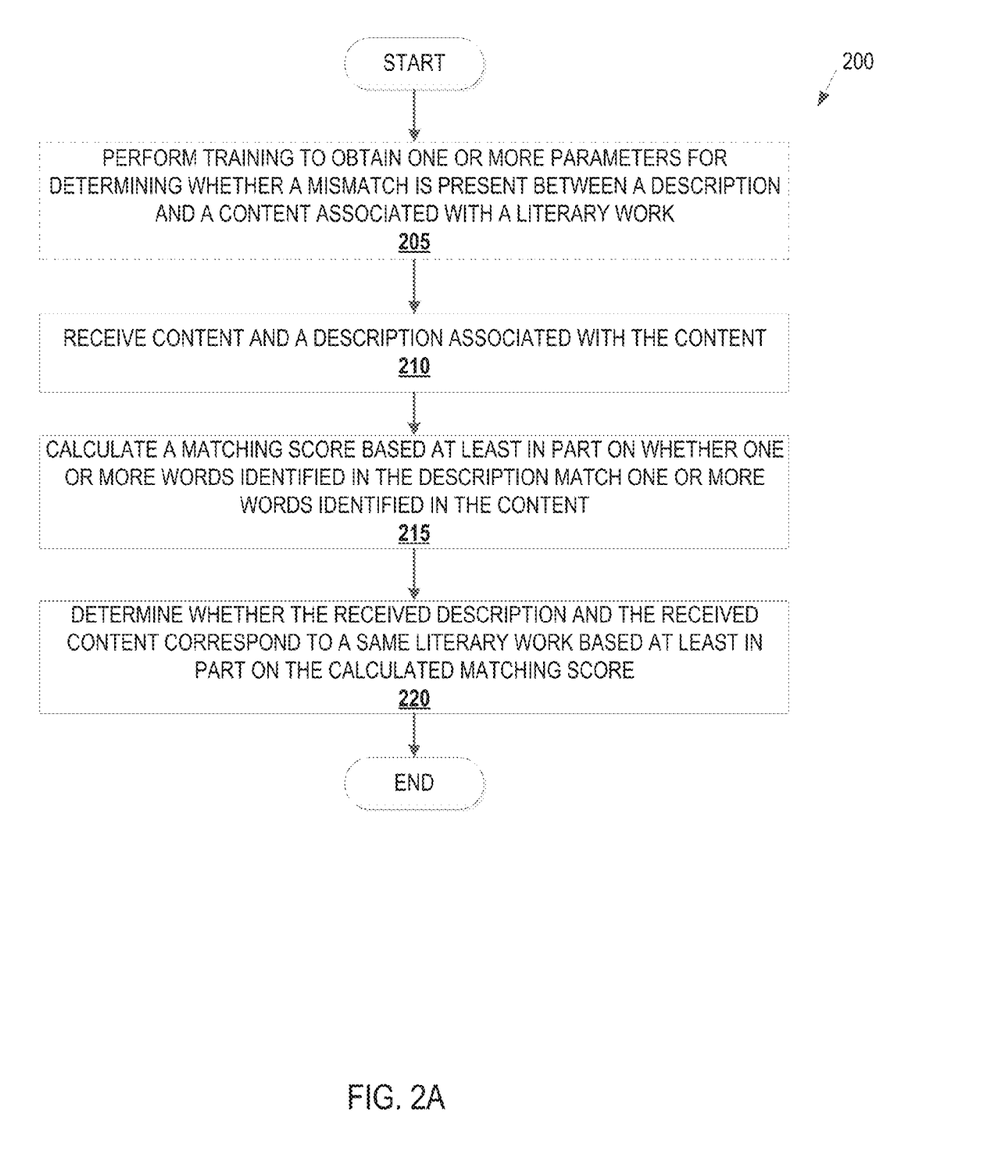
FIG. 2A is a flow diagram depicting an alternative method for determining whether a mismatch is present between a description and a content associated with a literary work, according to various embodiments.

Turning now to FIG. 2A, a method 200 illustrates an embodiment for determining whether a mismatch is present between a description and a content associated with a literary work. While FIG. 2A illustrates a plurality of sequential operations, one of ordinary skill would understand that one or more operations of the method 200 may be transposed and/or performed contemporaneously.

At the initialization of the method 200, operation 205 may comprise performing training to obtain one or more values for determining whether a mismatch is present between a description and a content associated with a literary work. This operation is not necessarily performed in all iterations of the method 200 and values obtained through operation 205 may be predetermined values for iterations of the method 200.

In various embodiments, operation 205 may comprise a plurality of operations. To start, operation 205 may include receiving or collecting a plurality of descriptions and contents associated with a plurality of works. These descriptions and contents may be separate and may be paired together in one or more iterations through the training operation 205 so that it is known whether a description is paired with a matching content. Additionally, operation 205 may include calculating or computing a matching score for a description and a content pair. This calculated or computed matching score may be performed as described herein, such as by deriving one or more stems for one or more words in the description and determining if those one or more description stems match one or more content stems derived from one or more words in the content. If a respective description stem matches a respective content stem then the matching score may be incremented (e.g., a value associated with the respective description stem may be added to the matching score), otherwise the matching score may be decremented (e.g., a value associated with the respective description stem may be subtracted from the matching score). Thereafter, operation 205 may include comparing the matching score to a predetermined threshold (e.g., zero) such that a matching score exceeding the predetermined threshold indicates a match and otherwise indicates a mismatch (although other relationships to the predetermined threshold are possible). From this comparison, operation 205 may include determining if the matching score is consistent with whether the description and the content are a known match or mismatch. Based on whether the matching score is consistent with the known matching status of the description and content pair, operation 205 may include varying one or more parameters (e.g., using an optimization method, such as Simplex) used to calculate the matching score. By varying one or more parameters, the calculated matching scores may be more frequently consistent with whether the description and the content pair are a known match or mismatch.

In various embodiments, the training operation 205 is used to obtain three parameters: $\alpha$, $\beta$, and $\gamma$. The parameters $\alpha$ and $\beta$ may be used to calculate a significance associated with one or more words (e.g., a significance value associated with a stem of a word) so that words are differently weighted in the calculation of the matching score. According to some embodiments, the frequency of each word d having a stem d' in the corpus V is calculated as $p(d')=(occ(d')+1)/(\|V\|)$, where $occ(d')$ is a function associated with the number of occurrences of a stem d' of a word d in the corpus V and $\|V\|$ is the number of words in the corpus. In such embodiments, the significance value of a stem d' of a word d may be calculated as $$s(d') = \frac{1}{1 + e^{\alpha + \beta \cdot p(d')}}.$$

Thus, words that appear less frequently in the corpus may be more significant in calculating the matching score. The third parameter $\gamma$ may be associated with name entities (e.g., proper names, places, etc.). In various embodiments, $\gamma$ may weight a name entity value (e.g., a value associated with one or more name entities from a description that also appear in a content) that factors into the calculation of the matching score.

The method 200 may further include an operation 210 for receiving content and a description associated with the content. The content may be associated with a literary work (e.g., a book, article, or similar text), and the description associated therewith may be intended and/or expected to summarize or abstract the content. In various embodiments, the content and description may be received over a network, such as through an interface provided to a user associated with the literary work (e.g., an author or publisher).

In connection with the received content and received description associated therewith, an operation 215 may comprise calculating a matching score based at least in part on whether one or more words identified in the description match one or more words identified in the content. Operation 215 may comprise operations for identifying words in the received description, identifying words in the received content, and determining whether a respective word identified in the description matches a word identified in the content. In various embodiments, the matching score may be positively adjusted if the respective word identified in the description matches one or more words identified in the content (e.g., a value may be added to the matching score) and negatively adjusted if not (e.g., a value may be subtracted from the matching score). Each word of the description may be iterated through to adjust the matching score (although the matching score may only be adjusted for each unique word, word stem, or unique stem of the description).

Subsequently, the method 200 reaches operation 220 for determining whether the received description and the received content correspond to a same literary work. This determination may be based at least in part on the matching score calculated at operation 215. According to various embodiments, the matching score may be compared to a predetermined threshold and the relationship of the matching score to that predetermined threshold may indicated whether the received description and the received content correspond to a same literary work. For example, the received description and the received content may be determined to correspond to a same literary work where the matching score exceeds the predetermined threshold. Similarly, the received description and the received content may be determined to be mismatched (e.g., the description may correspond to a different literary work) where the matching score equals or is less than the predetermined threshold.

Figure 2B:
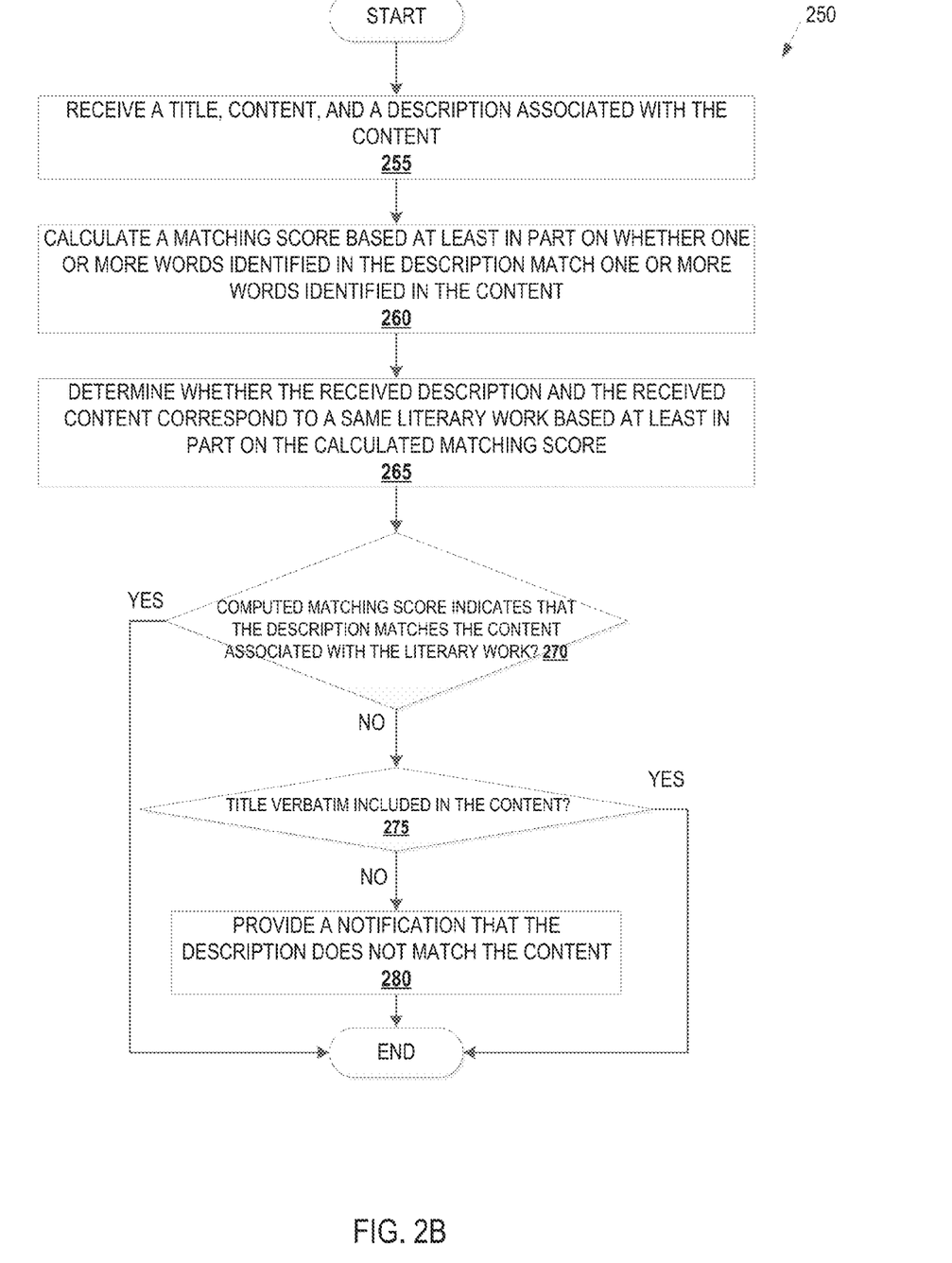
FIG. 2B is a flow diagram depicting another alternative method for determining whether a mismatch is present between a description and a content associated with a literary work, according to various embodiments.

With respect to FIG. 2B, a method 250 illustrates an embodiment for determining whether a mismatch is present between a description and a content associated with a literary work. While FIG. 2B illustrates a plurality of sequential operations, one of ordinary skill would understand that one or more operations of the method 250 may be transposed and/or performed contemporaneously.

The method 250 may begin with an operation 255 for receiving a title, content, and a description associated with the content. The content may be associated with a literary work (e.g., a book, article, or similar text) and the received title may be the title of the literary work, while the description associated the content may summarize or abstract the content. The method 250 may then advance to operations 260 and 265, which may be embodiments of operations 215 and 220, respectively, described above with respect to FIG. 2A.

The method 250 may include decision block 270, which may include operations described with respect to operation 220 of FIG. 2A. Where the computed matching score indicates that the description does match the content, as determined at decision block 270, the method 250 may end. However, where the computed matching score does not indicate that the received description matches the received content, the method 250 may reach decision block 275. Decision block 275 may include determining if the title is verbatim included in the content. In various embodiments, the received title may be a string of one or more words and, therefore, decision block 275 may comprise comparing the title string to one or more strings included in the received content using a string comparison algorithm to determine if the received title finds a match in the received content. If the received title finds a match in the received content, the method 250 may end.

Where the computed matching score indicates that the description does not match the content and the title is not verbatim included in the content, the method 250 may advance to operation 280. Operation 280 may comprise one or more operations for providing a notification that the description does not match the content. In various embodiments, this notification may be provided to a user from which the title, content, and description was received. Accordingly, the notification may alert the user that a mismatch is determined to be present between the description and the content received from the user.

Figure 3:
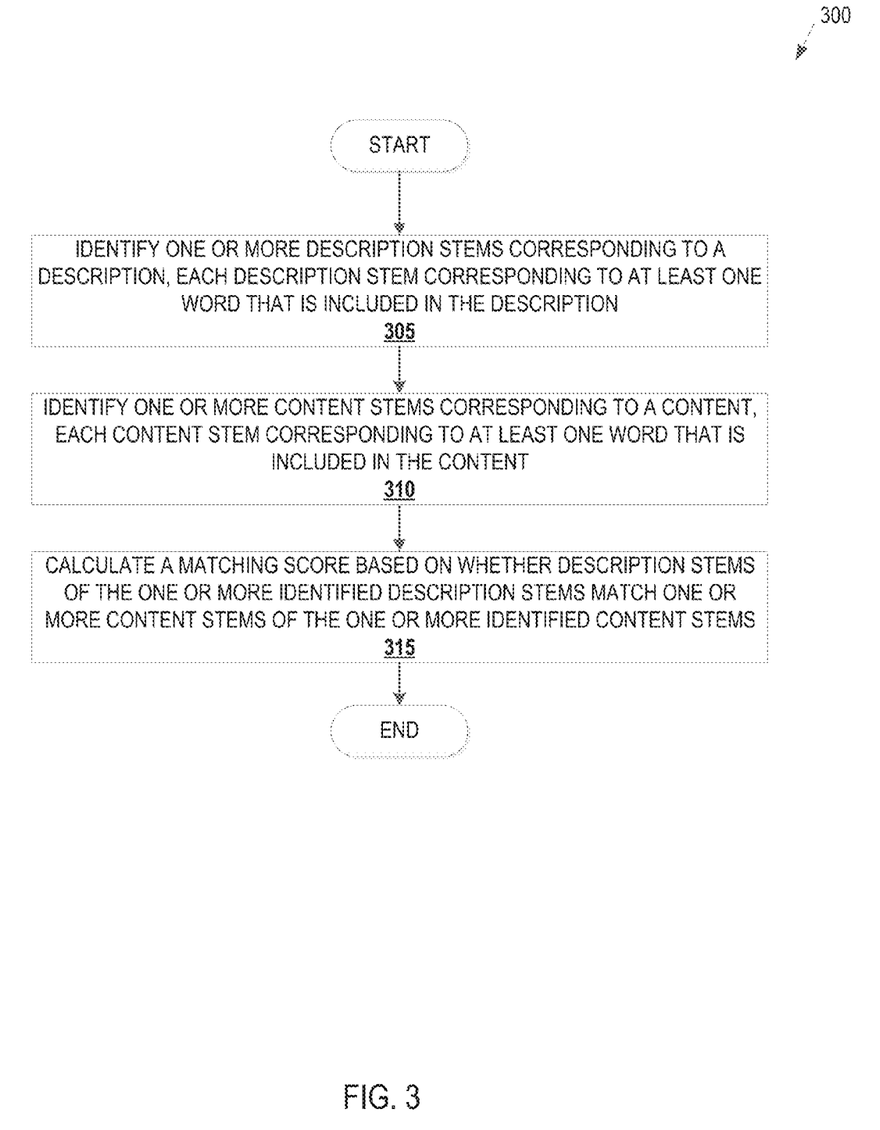
FIG. 3 is a flow diagram depicting a method for calculating a matching score between a description and content, according to various embodiments.

With respect to FIG. 3, a method 300 is shown illustrating an embodiment for calculating a matching score between a description and content. In various embodiments, this method 300 may be implemented in determining whether a mismatch is present between a description and a content associated with a literary work. While FIG. 3 illustrates a plurality of sequential operations, one of ordinary skill would understand that one or more operations of the method 300 may be transposed and/or performed contemporaneously.

As illustrated at operation 305, the method 300 may begin with identifying one or more description stems corresponding to a description associated with a literary work. Each description stem is to correspond to at least one word that is included in the description. Accordingly, a plurality of words included in the description (up to and including all of the words) may be evaluated so that one or more stems may be identified. In various embodiments, each of the one or more stems identified from the description may correspond to one word included in the description. A stem corresponding to a word included in the description may be identified in a variety of ways, according to the embodiment. In one embodiment, a stem corresponding to a word may be identified as a form to which affixes may be attached. In another embodiment, a stem may be a part of a word that is common to all inflected variants of that word. In various embodiments, different stems corresponding to different words may be differently identified—e.g., a first stem corresponding to a first word may be identified as a root of the first word, whereas a second stem of a second word may be identified as a form to which a suffix may be appended.

Similar to operation 305, operation 310 may include identifying one or more content stems corresponding to a content associated with a literary work. Each content stem is to correspond to at least one word that is included in the content. Accordingly, a plurality of words included in the content (up to and including all of the words) may be evaluated so that one or more stems may be identified. In various embodiments, each of the one or more stems identified from the content may correspond to only one word included in the content. In various embodiments, content stems may be identified through an approach that is similar or analogous to that used to identify the description stems.

Having identified description stems and content stems, operation 315 comprises calculating a matching score based on whether description stems of the one or more identified description stems match one or more content stems of the one or more identified content stems. In various embodiments, this operation 315 comprises positively adjusting a matching score for each description stem that matches at least one content stem (e.g., a value may be added to the matching score) and negatively adjusting the matching score for each description stem that does not match at least one content stem (e.g., a value may be subtracted from the matching score). In other embodiments, the matching score may be adjusted according to other formulas or algorithms, for example, the matching score may only be adjusted for each description stem that matches a content stem. In one embodiment, the matching score may only be adjusted for each unique description stem.

Figure 4:
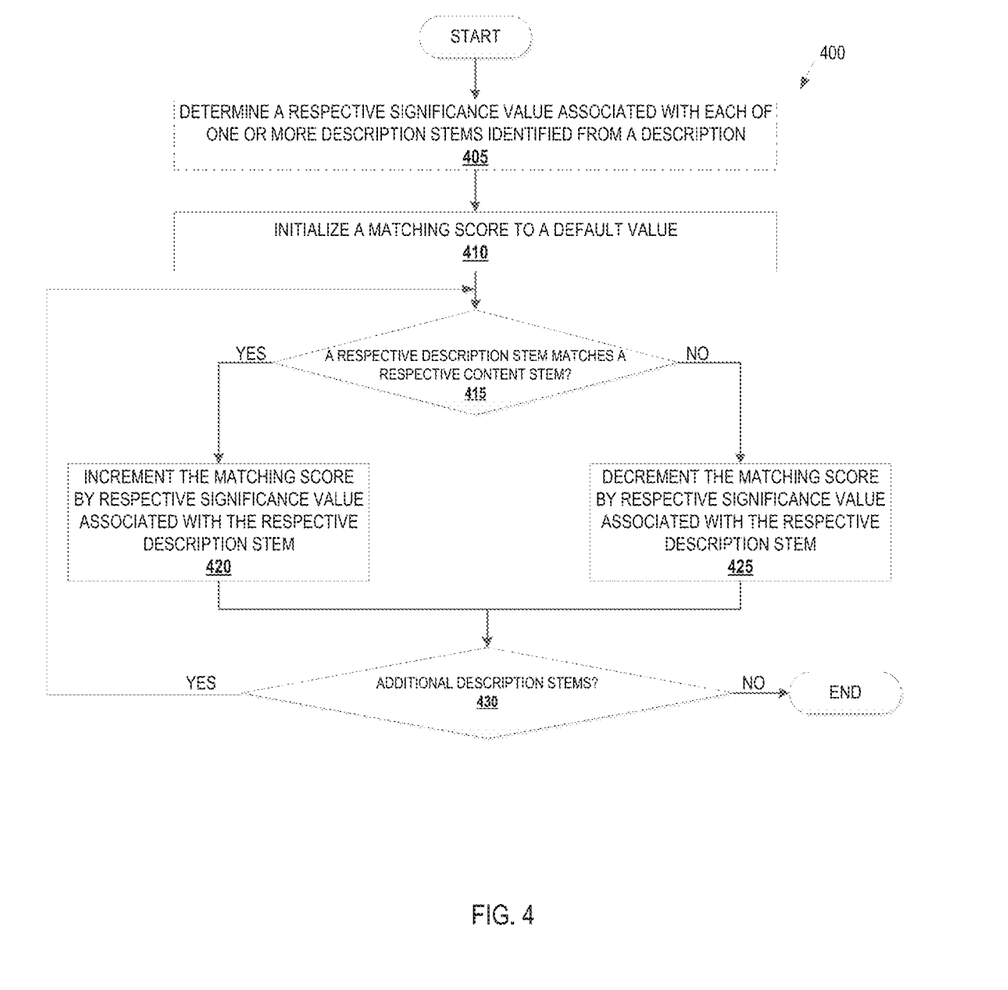
FIG. 4 is a flow diagram depicting a method for calculating a matching score based on whether description stems identified from a description match one or more content stems identified from a content associated with a literary work, according to various embodiments.

With respect to FIG. 4, a method 400 is shown illustrating an embodiment for calculating a matching score based on whether description stems identified from a description match one or more content stems identified from a content associated with a literary work. In various embodiments, this method 400 may be implemented in determining whether a mismatch is present between a description and a content associated with a literary work. While FIG. 4 illustrates a plurality of sequential operations, one of ordinary skill would understand that one or more operations of the method 400 may be transposed and/or performed contemporaneously.

As illustrated at operation 405, the method 400 may begin with determining a respective significance value for each description stem identified from a description. According to an embodiment, a plurality of significance values associated with a plurality of stems may be predetermined, such as through a training operation (not shown). In various embodiments, this operation 405 may comprise calculating a significance value for each description stem. For example, a respective significance value associated with a description stem may be calculated based on the frequency that description stem appears in a corpus or another large collection of textual works. A respective significance value associated with a description stem may indicate a stem that is uncommonly found in textual works—e.g., the stem derived from the word "hyperbolic" is less common than the stem derived from "placing" and, therefore, the stem corresponding to "hyperbolic" may be more significant in calculating a matching score.

According to some embodiments of the method 400, calculating a matching score includes an operation 410 for initializing the matching score to a default value. The default value may be any value, such as an integer, and may be important in some embodiments because the default value may be equal to a predetermined threshold to which the matching score may be compared to determine whether the description and the content correspond to a same literary work. Subsequently, decision block 415 illustrates iterating through one or more description stems identified from a description and comparing a respective description stem to a one or more content stems identified from a content. Accordingly, one or more description stems may be determined to match one or more content stems.

Where the respective description stem matches one or more content stems, the method 400 reaches operation 420. At this operation 420, the method 400 includes incrementing the matching score by the respective significance value associated with the respective description stem (e.g., adding the respective significance value associated with the respective description stem to the matching score). Conversely, where the respective description stem does not match one or more content stems, the method 400 reaches operation 425. This operation 425 includes decrementing the matching score by the respective significance value associated with the respective description stem (e.g., subtracting the respective significance value associated with the respective description stem from the matching score). Effectively, the matching score may be adjusted based on weighted values associated with different stems so that some (e.g., uncommon) stems may have a greater effect on the matching score.

Following an appropriate adjustment of the matching score pursuant to one of operations 420 and 425, the method 400 may reach decision block 430. Where one or more additional description stems are to be compared to the one or more content stems, the method 400 may return to advance to a next description stem and revisit decision block 415. However, if no additional description stems remain, the method 400 may end and the calculated matching score may be used to determine whether a mismatch is present between a description and a content associated with a literary work.

Figure 5:
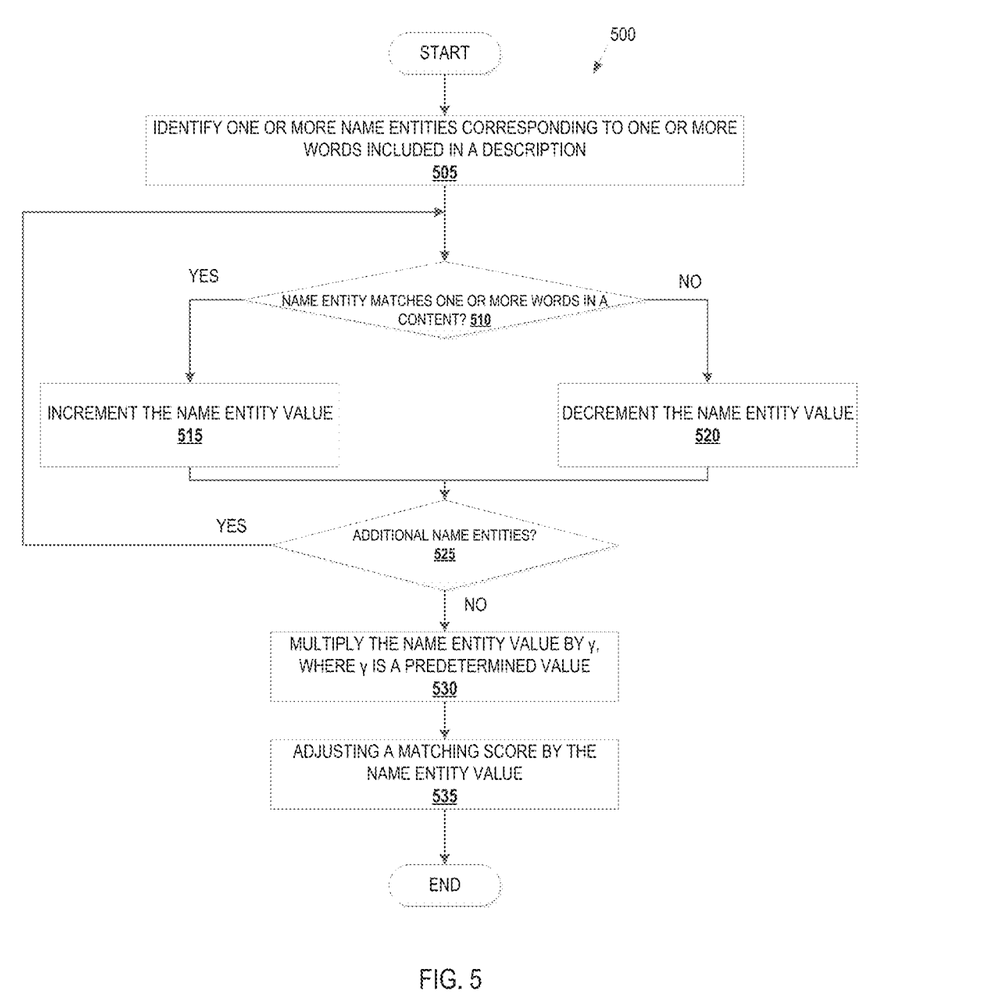
FIG. 5 is a flow diagram depicting a method for calculating a matching score based on based on whether one or more name entities included in a description match one or more words of a content associated with a literary work, according to various embodiments.

With respect to FIG. 5, a method 500 is shown illustrating an embodiment for calculating a matching score based on whether one or more name entities included in a description match one or more words of a content associated with a literary work. In various embodiments, this method 500 may be implemented in determining whether a mismatch is present between a description and a content associated with a literary work. According to one embodiment, the method 500 may adjust a matching score that has been calculated based on whether description stems identified from the description match one or more content stems identified from the content associated with the literary work. While FIG. 5 illustrates a plurality of sequential operations, one of ordinary skill would understand that one or more operations of the method 500 may be transposed and/or performed contemporaneously.

Starting at operation 505, the method 500 may begin with identifying one or more name entities corresponding to one or more words included in a description. According to embodiments, a name entity may be any linguistic element, such as a word or combination of words, and may be, for example, a name of a person, an organizations, a locations, expressions of values, or essentially any other discrete element. In various embodiments, one or more predetermined algorithms may be employed to identify the one or more name entities.

Subsequently, decision block 510 illustrates iterating through the one or more identified name entities and comparing a respective name entity to one or more words from a content. Accordingly, one or more name entities may be determined to match one or more words from the content. In various embodiments, a respective name entity may be determined to match one or more words in the content through a string comparison algorithm or other similar algorithm that may match a first set of one or more words to a second set of one or more words. Thus, a respective name entity that spans a plurality of words and/or includes symbols such as punctuation (e.g., "Columbia, Mo., United States") may be appropriately determined to match in the content.

Where a respective name entity is determined to match in the content, the method 500 reaches operation 515. At this operation 515, the method 500 includes incrementing (e.g., by a value of one) a name entity value. In various embodiments, the name entity value may be any value, such as an integer initialized to a default value (e.g., zero), and may be important because the name entity value may be used to adjust a matching score for determining whether the description and the content correspond to a same literary work (e.g., the name entity value may be added to the matching score, whether the name entity value is positive or negative). Where, however, the respective name entity is determined not to match in the content, the method 500 reaches operation 520. This operation 520 includes decrementing (e.g., by a value of one) the name entity value.

Following an appropriate adjustment of the matching score pursuant to one of operations 515 and 520, the method 500 may reach decision block 525. Where one or more additional entities are to be determined to match in the content, the method 500 may return to advance to a next name entity and revisit decision block 510. However, if no additional name entities remain, the method 500 may advance to operation 530.

At operation 530, the name entity value may be multiplied by a predetermined value $\gamma$. In various embodiments, the predetermined value $\gamma$ may be a parameter obtained through a training operation (not shown) and may effectively weight the name entity value where the name entity value adjusts another value. To that end, operation 535 comprises adjusting a matching score by the calculated name entity value. In various embodiments, the name entity value can be a positive or negative number, so the name entity value may cause the matching score to be positively or negatively adjusted to indicate a match or mismatch, respectively. Accordingly, the calculated matching score may be used to determine whether a mismatch is present between a description and a content associated with a literary work.

Figure 6:
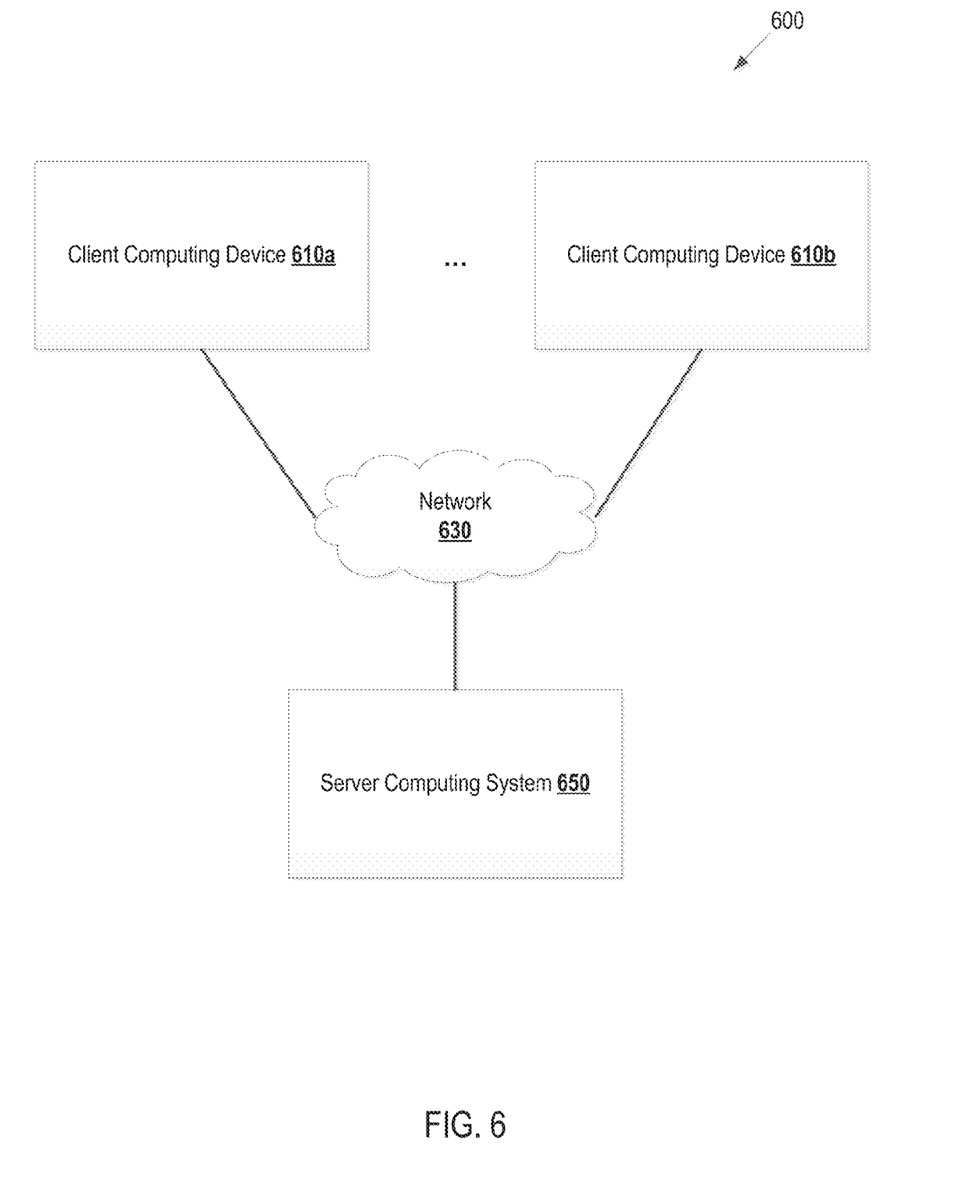
FIG. 6 is a block diagram depicting a networked computing environment that includes client computing systems adapted to provide a description and a content associated with a literary work and a server computing system adapted to receive the same, according to various embodiments.

Now at FIG. 6, a system 600 is depicted for determining whether a mismatch is present between a description and a content associated with a literary work, according to various embodiments. The system 600 includes, but is not limited to, a server computing system 650 (herein, "server 650"), a plurality of client computing devices 610a-b (herein, "clients 610a-b"), and a network 630. A client 610 may be any type of client, such as a personal computer (e.g., a desktop computer, laptop computer, server, a tablet computer), a workstation, a handheld device, a web-enabled appliance, a gaming device, a mobile phone (e.g., a Smartphone), an eBook reader, or any computing device operable to communicate over the network 630. Accordingly, the clients 610a-b are configured for inter-system communication across a network 630. The network 630 may be a public, private, wired, wireless, hybrid network, or a combination of different types of networks. The network 630 may be implemented as a local area network ("LAN"), a wide area network ("WAN") such as the Internet, a corporate intranet, a metropolitan area network ("MAN"), a storage area network ("SAN"), a Fibre Channel ("FC") network, a wireless cellular network (e.g., a cellular data network), or a combination thereof.

The network 630 may communicatively couple a client 610 with a server 650. The server 650 may include any arrangement of hardware and software embodied in a computing device configured to provide access to one or more services to a client 610 over the network 630. In various embodiments, the server 650 may include a server operating system, one or more software applications and hardware (e.g., dedicated hardware) adapted to receive requests from a client 610 over the network 630 and respond as configured. In some embodiments, the server 650 may include a plurality of physical devices (e.g., hardware distributed in multiple physical machines). Thus, the server 650 may include two or more coupled computing devices that cooperatively operate and may be visible across the network 630 as a single system.

The arrangement of the server 650 and the clients 610a-b in the system 600 may be allow the server 650 to provide an interface to a client 610. The interface may be adapted to separately received one or more inputs associated with a literary work, such as a literary work that is to be digitally disseminated (e.g., published as an eBook). A client 610 may transmit one or more inputs associated with a literary work (e.g., a title, description, and content) over the network 630 to the server 650 through the interface provided by the server 650. In response, the server 650 may evaluate the one or more inputs to determine if such inputs match or otherwise correspond to a same literary work. Where the server 650 determines that two inputs (e.g., a content and a description) do not correspond to a same literary work, the server 650 and may provide the client 610 with an appropriate notification of such. According to embodiments, the server 650 may be adapted to perform a plurality of operations, such as those operations described herein in FIG. 1-FIG. 5.

Figure 7:
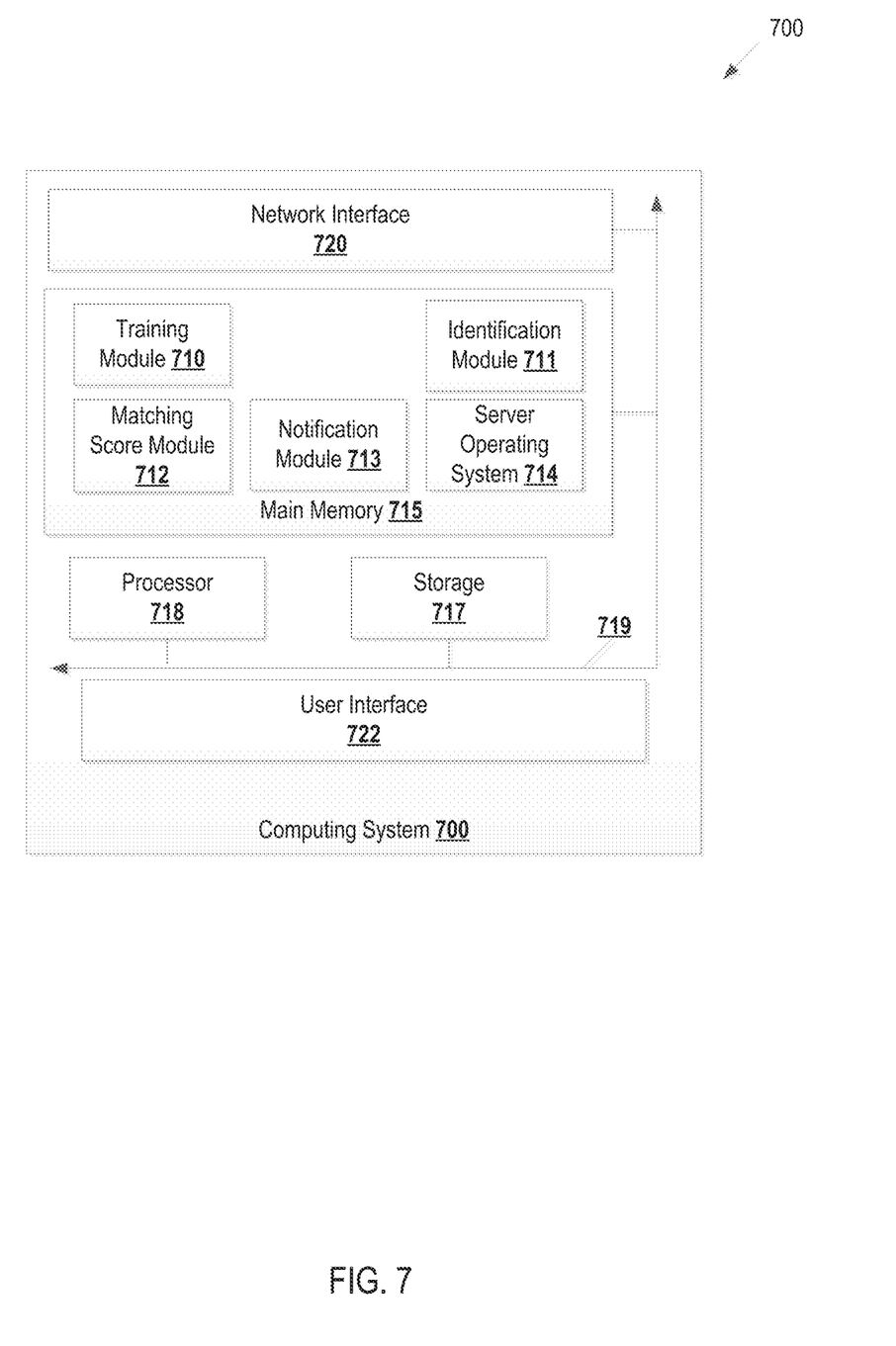
FIG. 7 is a block diagram depicting a computing system adapted to determine whether a mismatch is present between a description and a content associated with a literary work, according to various embodiments

Turning now to FIG. 7, an embodiment of a computing system 700 is shown. The computing system 700 may be included in the server 650 of FIG. 6. According to embodiments, the computing system 700 may be adapted to perform a plurality of operations, such as those operations described herein in FIG. 1-FIG. 5. The computing system 700 includes, but is not limited to: main memory 715, storage 717, processor 718, network interface 720, and/or user interface 722. These components may be communicatively coupled through a bus 719. The bus 719 may be any subsystem adapted to transfer data within the computing system 700. The bus 719 may include a plurality of computer buses as well as additional circuitry adapted to transfer data.

To communicate data with another computing device (not shown), the computing system 700 includes a network interface 720. The network interface 720 may accept data across a network (not shown) from a computing device to be processed by the computing system 700. Correspondingly, the network interface 720 may transmit data across a network, such as a response to a received request. The network interface 720 may be implemented in hardware, software, or a combination of the two and may include, for example, components such as a network card, network access controller, or a host bus adapter. The network interface 720 is communicatively coupled with the processor 718, which executes instructions for the computing system 700. In one embodiment, some or all of the instructions for the network interface 720 are executed by the processor 718.

As an additional means of receiving data, the computing system 700 may include a user interface 722 to receive input from a user. The user interface 722 may allow a user to interact with the computing system 700 through various means, according to different embodiments—e.g., the user interface 722 may be presented to a user on a display (not shown) as a graphical user interface or through a command line interface. To receive user input, the user interface 722 may be implemented in hardware, software or a combination of the two and may include or may be communicatively coupled with one or more hardware devices suitable for user input (e.g., a keyboard, a mouse or touch screen). Further, some or all of the instructions for the user interface 722 may be executed by the processor 718.

The processor 718 may be any processor suitable to execute instructions of the components 710-714 illustrated in the main memory 715. Accordingly, the processor 718 may be, for example, a central processing unit ("CPU"), a microprocessor, or other similar processor. In some embodiments, the processor 718 includes a plurality of processors, such as a dedicated processor (e.g., a graphics processing unit), a network processor or any processor suitable to execute operations of the computing system 700.

Coupled to the processor 718 is the main memory 715. The main memory 715 may offer both short-term and long-term storage and may in fact be divided into several units (including a unit located at the processor 718). The main memory 715 may be volatile, such as static random access memory ("SRAM") and/or dynamic random access memory ("DRAM") and may provide storage (at least temporarily) of computer readable instructions, data structures, software applications, and other data for the computing system 700. Such data may be loaded from the storage 717. The main memory 715 may also include cache memory, such as a cache located at the processor 718. The main memory 715 may include, but is not limited to, a number of components 710-714 that are configured to be executed by the processor 718: a training module 710, an identification module 711, a matching score module 712, a notification module 713, and a server operating system 714.

In various embodiments, the server operating system 714 is configured to initiate the execution of the instructions, such as instructions provided by a module 710-713. In particular, the server operating system 714 may be adapted to serve as a platform for running the modules 710-713. The server operating system 714 may be adapted to perform other operations across the components of the computing system 700 including threading, resource management, data storage control and other similar functionality.

The server operating system 714 may cause the processor 218 to execute instructions for a module 710-713. A module 710-713 may include code representing instructions configured to provide functionality to a client computing device, such as in response to an input from the client computing device. A module 710-713 may be, for example, a software application, framework or library. In various embodiments, a module 710-713 may provide data storage, manipulation, communication, or other similar functionality, which may be accessible to a client computing device over a network.

In various embodiments, the training module 710 may be adapted to determine one or more parameters that are used in a matching algorithm for comparing a description and/or a title to a content associated with a literary work. Further, the training module 710 may be adapted to calculated and/or provide one or more significance values associated with one or more words, such as a significance value for a stem of a word. In various embodiments, the training module 710 is adapted to map the frequency of a word or word stem in a corpus or other collection of texts to a significance value associated with that word or word stem. The training module 710 may be adapted to provide this information, such as the parameters and/or significance values, to another module 711-713, such as the matching score module 712.

The identification module 711 may be adapted to identify one or more stems from one or more inputs, such as descriptions and/or contents received through an interface 720, 722. Further, the identification module 711 may be adapted to identify one or more name entities from those one or more inputs. The identification module 711 may be adapted to provide this information, such as identified stems and/or name entities, to another module 710, 712, 713.

In various embodiments, the matching score module 712 may be adapted to compute a matching score based on one or more stems and/or one or more name entities identified through the identification module 711. In various embodiments, the matching score module 712 may positively adjust the matching score for one or more description stems identified from a description input that match one or more content stems identified from a content input. Correspondingly, the matching score module 712 may negatively adjust the matching score for one or more description stems identified from a description input that do not match one or more content stems identified from a content input. Additionally, the matching score module 712 may positively adjust the matching score for one or more name entities identified from a description input that match in a content input. The matching score module 712 may be adapted to provide this information, such as the calculated matching score, to another module 710, 711, 713.

In various embodiments, the notification module 713 may be adapted to determine if a computed matching score indicates that a description input matches a content input—e.g., that the description input and the content input correspond to a same literary work. In various embodiments, the notification module 713 may be adapted to compare the computed matching score to a predetermined threshold and the matching score's relationship to that predetermined threshold may indicate whether the description input matches the content input. In various embodiments, the notification module 713 may provide an indication through an interface 720, 722 notifying a user that a received description input does not match a received content input. According to one embodiment, the notification module 713 may decline to provide this notification where a received title matches in the received content.

Any of the module 710-713 and/or the server operating system 714 may persistently store and/or access data at a storage 717. The storage 717 may include non-volatile memory, such as read-only memory ("ROM") and/or mass storage. The storage 717 may be implemented as, for example, conventional magnetic disks, optical disks such as CD-ROM or DVD based storage, magnetic tape storage, magneto-optical ("MO") storage media, solid state disks, flash memory based devices, or any other type of storage devices suitable for storing data. In some embodiments, the storage 717 includes registers, caches or other similar temporary memory components. Though illustrated as a single device, storage 717 may be a combination of several devices.

It should be appreciated that embodiments as will be hereinafter described may be implemented in conjunction with the execution of instructions by the processor 718 and/or other circuitry of the computing system 700. In particular, logic of the computing system 700, including but not limited to the processor 718, may operate under the control of a program, routine or the execution of instructions to execute methods or processes in accordance with embodiments described herein. For example, a module 710-711 may be implemented in firmware, software (e.g., stored in main memory) or hardware (e.g., an application-specific integrated circuit) and may be implemented by the processor 718 and/or other logic of the computing system 700. Further, it should be appreciated that the terms processor, microprocessor, circuitry, controller, etc., refer to any type of logic or circuitry capable of executing logic, commands, instructions, software, firmware, functionality and the like.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments are not described with reference to any particular programming language. It will be appreciated that a variety of programming languages may be used to implement the teachings of embodiments as described herein.

In the foregoing Specification, embodiments have been described with reference to specific exemplary embodiments thereof. It will be evident that various modifications may be made thereto without departing from the broader spirit and scope of the embodiments described herein as set forth in the following claims. The Specification and drawings are, accordingly, to be regarded in an illustrative sense rather than a restrictive sense.

What is claimed is:

1. A computer-implemented method for determining whether a mismatch is present between a description and content associated with a literary work, the method comprising:
   separately receiving, by a computer system from a publisher system, a title, a description, and a content associated with a literary work;
   identifying, by the computer system, a first plurality of words included in the description;
   identifying, by the computer system, a second plurality words that is included in the content;
   computing, by the computer system, a matching score based on initializing the matching score to zero, incrementing the matching score for each word in the first plurality of description words that matches at least one word in the second plurality of content words, and decrementing the matching score for each word in the first plurality of words that does not match any words in the second plurality of content words;
   determining, by the computer system, whether the title is verbatim included in the content; and
   notifying, by the computer system, the publisher system that the description does not match the content associated with the literary work where the computed matching score is less than zero, thereby indicating that the description does not match the content associated with the literary work, and the title is determined not to be verbatim included in the content.

2. The computer-implemented method of claim 1, wherein the matching score is incremented and decremented by a respective significance value associated with a respective word included in the description.

3. The computer-implemented method of claim 2, wherein the computing of the matching score is further based on a number of name entities identified from the received description that match one or more words identified from the received content, the method further comprising:
   identifying the one or more name entities included in the received description, a respective name entity to correspond to one or more words included in the received description;

calculating a name entity value based on initializing the name entity value to zero, incrementing name entity value for each name entity in the first plurality of description words that matches at least one name entity in the second plurality of content words, and decrementing the name entity value for each name entity in the first plurality of words that does not match any name entities in the second plurality of content words; and adjusting the matching score based on the calculated name entity value.

4. The computer-implemented method of claim 1, wherein the identifying the first plurality of words included in the description and the identifying the second plurality of words included in the content comprises:

identifying description stems included in the description, each description stem to correspond to a word included in the description; and identifying content stems included in the content, each content stem to correspond to a word included in the content.

5. A computer-implemented method, the method comprising:

receiving, by a computer system, content and a description associated with the content;

calculating, by the computer system, a matching score based on incrementing the matching score by a respective significance value associated with a respective description word included in the description where the respective description word matches one or more words included in the content and decrementing the matching score by the respective significance value associated with the respective description word where the respective description word does not match any of the words included in the content; and determining, by the computer system, whether the received description and the received content correspond to a same literary work based at least in part on the calculated matching score.

6. The computer-implemented method of claim 5, the method further comprising:

notifying, by the computer system, a user associated with the same literary work that the received description and the received content do not correspond to the same literary work based on the determining whether the received description and the received content correspond to the same literary work.

7. The computer-implemented method of claim 5, wherein the calculating the matching score comprises:

identifying, by the computer system, one or more description stems corresponding to the received description, each description stem of the one or more description stems corresponding to one or more words included in the received description;

identifying, by the computer system, one or more content stems corresponding to the received content, each content stem of the one or more content stems corresponding to one or more words included in the received content; and calculating, by the computer system, the matching score based on incrementing the matching score by a respective significance value associated with a respective stem identified in the description where the respective stem matches one or more stems identified in the content and decrementing the matching score by the respective significance value associated with the respective stem where the respective stem does not match any of the words identified in the content.

8. The computer-implemented method of claim 7, further comprising:

determining the respective significance value associated with the respective stem identified in the description.

9. The computer-implemented method of claim 8, wherein the determining the respective significance value comprises:

calculating $$s(d') = \frac{1}{1 + e^{\alpha + \beta \cdot p(d')}},$$

where $\alpha$ and $\beta$ are predetermined values used to map a frequency in a corpus of the description stem d' to the respective significance value and p(d') is the frequency of the description stem d' in the corpus.

10. The computer-implemented method of claim 5, wherein the calculating the matching score is additionally based on whether one or more name entities included in the received description match one or more words of the received content, and the calculating the matching score further comprises:

identifying the one or more name entities included in the received description, a respective name entity to correspond to one or more words included in the received description;

calculating a name entity value based on whether the one or more identified name entities match one or more words of the received content; and adjusting the matching score based on the calculated name entity value.

11. The computer-implemented method of claim 10, wherein the calculating the name entity value based on whether the one or more identified name entities match one or more words of the received content comprises:

incrementing the name entity value for each of the one or more identified name entities that match one or more words of the received content; and decrementing the name entity value for each of the one or more identified name entities that do not match one or more words in the received content.

12. The computer-implemented method of claim 10, wherein the adjusting the matching score based on the calculated name entity value comprises:

multiplying the name entity value by $\gamma$, where $\gamma$ is a predetermined value; and incrementing the matching score by the $\gamma$-multiplied name entity value.

13. A computer system for determining whether a mismatch is present between content and a description associated with a literary work, the system comprising:

one or more processor; and one or more memory having processor-executable instructions that, in response to execution by the one or more processor, cause the computer system to:

receive, from a user, a content and a description;

identify one or more description stems associated with the received description, each description stem to correspond to one or more words included in the description;

identify one or more content stems associated with the received content, each content stem to correspond to one or more words included in the content;

calculate a matching score based at least in part on whether one or more description stems identified in the description match one or more contents stems identified in the content; and determine whether the received description and the received content correspond to a same literary work based at least in part on the calculated matching score.

14. The computer system of claim 13, wherein the instructions to calculate the matching score based on whether the one or more identified description stems match one or more identified content stems comprise instructions to:

increment the matching score if a respective description stem matches of the one or more identified description stems one or more identified content stems; and decrement the matching score the matching score if the respective description stem of the one or more identified description stems does not match any of the identified content stems.

15. The computer system of claim 14, wherein the respective description stem is associated with a respective significance value, and further wherein the instructions to increment the matching score and decrement the matching score are to increment and decrement the matching score by the respective significance value.

16. The computer system of claim 13, wherein the instructions to determine whether the received description and the received content correspond to the same literary work based at least in part on the calculated matching score comprise instructions to:

receive a title associated with the same literary work;

determine whether the received description and the received content correspond to the same literary work where the title verbatim matches one or more words in the received content or the calculated matching score indicates that the received content and the received description correspond to the same literary work.

17. The computer system of claim 13, wherein the instructions further cause the computer system to:

provide an indication that the received description and the received content do not correspond to the same literary work based on the determination whether the received description and the received content correspond to the same literary work.

18. The computer system of claim 13, wherein the matching score is calculated additionally based on whether one or more name entities included in the received description match one or more words in the received content, and wherein the instructions further comprise instructions to:

identify the one or more name entities included in the received description, each name entity to correspond to one or more words included in the received description;

calculate a name entity value based on whether the one or more identified name entities match one or more words included in the received content; and adjust the matching score based on the calculated name entity value.

19. A non-transitory computing device-readable medium comprising computing device-executable instructions for determining whether a mismatch is present between content and a description associated with a literary work, wherein the instructions, in response to execution by a computing device, cause the computing device to:

receive, from a user, a content, a title, and a description associated with the literary work;

identify one or more description stems associated with the received description, each description stem to correspond to one or more words included in the description;

identify one or more content stems associated with the received content, each content stem to correspond to one or more words included in the content;

calculate a matching score based at least in part on whether one or more description stems identified in the description match one or more contents stems identified in the content;

determine whether the received description and the received content correspond to the literary work based on the calculated matching score; and provide, to the user, a notification that is to indicate that the received description does not correspond to the received content associated with the literary work where the determination indicates that the received description does not correspond to the received content associated with the literary work and the received title does not match one or more words of the received content.

20. The non-transitory computing device-readable medium of claim 19, wherein the instructions to calculate the matching score based on whether one or more description stems identified in the description match one or more contents stems identified in the content further includes instructions to calculate the matching score based on whether one or more name entities included in the received description matches one or more words in the received content, the instructions to further cause the computing device to:

identify the one or more name entities corresponding to one or more words that are included in the received description;

calculate a name entity value based on whether the one or more identified name entities match one or more words included in the received content; and adjust the matching score based on the calculated name entity value.

* * * * *